US007603426B2

(12) United States Patent
Geller et al.

(10) Patent No.: US 7,603,426 B2
(45) Date of Patent: Oct. 13, 2009

(54) FLEXIBLE CONTEXT MANAGEMENT FOR ENUMERATION SESSIONS USING CONTEXT EXCHANGE

(75) Inventors: Alan S. Geller, Redmond, WA (US); Donald F. Box, Bellevue, WA (US); Luis Felipe Cabrera, Bellevue, WA (US); Raymond W. McCollum, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 863 days.

(21) Appl. No.: 10/872,119

(22) Filed: Jun. 18, 2004

(65) Prior Publication Data

US 2006/0047757 A1    Mar. 2, 2006

(51) Int. Cl.
*G06F 15/16* (2006.01)
*H04J 3/22* (2006.01)
(52) U.S. Cl. ..................................... 709/207; 370/471
(58) Field of Classification Search .................. 709/205, 709/206, 207
See application file for complete search history.

(56) References Cited

U.S. PATENT DOCUMENTS

| | | | | |
|---|---|---|---|---|
| 5,621,892 A * | 4/1997 | Cook | ......................... | 709/224 |
| 5,724,514 A * | 3/1998 | Arias | ......................... | 709/235 |
| 5,724,578 A * | 3/1998 | Morinaga et al. | ........... | 707/100 |
| 5,799,150 A * | 8/1998 | Hamilton et al. | ............ | 709/203 |
| 5,987,510 A * | 11/1999 | Imai et al. | .................... | 709/219 |
| 6,018,780 A * | 1/2000 | Fenchel | ....................... | 710/105 |
| 6,085,251 A * | 7/2000 | Fabozzi, II | .................. | 709/230 |
| 6,192,412 B1 * | 2/2001 | Cantoral et al. | ............. | 709/236 |
| 6,553,410 B2 * | 4/2003 | Kikinis | ....................... | 709/218 |

FOREIGN PATENT DOCUMENTS

| | | |
|---|---|---|
| EP | 1307021 A2 | 5/2003 |
| EP | 1536349 | 6/2005 |
| WO | 02/27516 | 4/2002 |
| WO | 2004/023341 | 3/2004 |

OTHER PUBLICATIONS

Richard Stevens, TCP/IP Illustrated vol. 1 The Protocols, 1994, Chapters 17-21.*

* cited by examiner

*Primary Examiner*—William C Vaughn, Jr.
*Assistant Examiner*—Ninos Donabed
(74) *Attorney, Agent, or Firm*—Workman Nydegger

(57) ABSTRACT

Mechanisms for providing requested data items in a request-driven enumeration session while retaining control over how much inter-message context information is retained by the data provider. Upon receiving a request for the data items, the data provider identifies a portion of the data items to be provided in the first response along with context information that reflects that the first portion of information has been provided. The data provider then makes a determination of how much of the context is to be provided to the data receiver system, and then provides that appropriate context information to the data receiver. Furthermore, the data provider provides a response that includes the first portion of the data items. The data receiver includes this first provided context information in the second request for the next portion of the data items, allowing continuity in the data transfer session.

46 Claims, 4 Drawing Sheets

FLEXIBLE CONTEXT MANAGEMENT FOR ENUMERATION SESSIONS USING CONTEXT EXCHANGE

BACKGROUND OF THE INVENTION

1. The Field of the Invention

The present invention relates to computing technology; and more specifically, to the network distribution of multiple data items in multiple responses while controlling which computing system manages context information for the communications.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Networking technologies enable computing systems to communicate even over vast distances, thereby expanding on computer functionality. For example, networking technologies enable such applications as e-mail, web browsing, file transfer, instant messaging, electronic whiteboarding, network collaboration, and the like.

Some networking applications involve the transfer of large amounts of information. For instance, one may desire to download a database that is several terabytes in size. Even over a high bandwidth network, this can take days. Even in fairly reliable network environments, there is a significant possibility that a network connection cannot be maintained for that entire period. If the connection is lost, often the entire data transfer must be reinitiated from the start.

One conventional method for improving the reliability and efficiency of large data transfers is to transfer the data one portion at a time in separate electronic messages. Sometimes, this may be accomplished automatically in response to a single request. However, to allow the data receiver some control over the data transfer process, the data receiver may submit a request for each electronic message that contains a portion of the overall data transfer. For example, a web site has large amounts of data associated with it including web pages, images, sound files, other multimedia, scripts or the like. The web browser will often submit separate requests for each of these data items. This technology will be referred to as "request-driven enumeration technology" in which collections of data items are "enumerated" one portion at a time in separate responses to separate requests.

In order to meet the expectations of the data receiver computing system, it is important for each request to be understood in its proper context. For example, suppose that fifty data items are to be transferred total, ten data items at a time in a session of five responses to five different requests. When the first request is submitted, it is important for the data provider to not just know the identity of the fifty data items, but to also know that this is the first request. That way, the data provider knows to transfer the first ten of the data items. When the second request is received, it is important for the data provider to know that the previous ten data items have already been provided. Otherwise, the data provider may provide the first ten items again. Therefore, the data provider must have proper context for a request in request-driven enumeration technologies. In this description and in the claims, a "context" for a request in a request-driven enumeration technology session is defined as any information needed or helpful for the data provider to know what portion of the data items to provide in response to the request.

Conventionally, responsibility for maintaining this context information is static. For example, the data provider may maintain session information for a large data transfer to a particular data receiver. This session information may include context information. In other conventional technologies, the data receiver maintains the context information. The context information is provided by the data provider to the data receiver. The data receiver then includes that context information in the next request for the next portion of the collection of data items. Regardless of which system is managing the context information, the responsibility for managing the context information is predetermined at the time the data transfer session is initiated. Furthermore, context management responsibility does not tend to shift over the session lifetime.

Whether it is advantageous for the data provider or the data receiver to maintain the context information depends on the surrounding circumstances. Many of these surrounding circumstances are highly dynamic. Accordingly, what would be advantageous are mechanisms for allowing the data provider computing system to have more flexibility and dynamic control over the division of labor between the data provider and the data receiver in managing the context information for a data transfer session.

BRIEF SUMMARY OF THE INVENTION

The foregoing problems with the prior state of the art are overcome by the principles of the present invention, which are directed towards a mechanism for a data provider computing system to provide requested data items in a request-driven enumeration session in which portions of the requested data items are provided in response to separate requests from a data receiver computing system. The mechanism permits the data provider to control how much inter-message context information is retained by the data provider, and how much context information is provided to the data receiver.

Upon receiving a first request for the data items to be provided to a data receiver, the data provider identifies data items to be provided to the data receiver. This identification may be based at least in part upon information within the first request. The data provider then identifies a first portion of the data items to be provided in a first response corresponding to the first request. In addition, context information is identified that reflects that the first portion of information has been provided. The data provider then makes a determination of how much of the context is to be provided to the data receiver computing system. The data provider then constructs the first response, which includes the first portion of the data items. The data provider also provides as much context information to the receiver computing system as deemed appropriate by the data provider.

The data receiver includes this first provided context information in the second request for the next portion of the data items. The data provider need not retain this first provided context information between requests. Instead, the data provider reads the first provided context information from the second request. This aids the data provider in identifying the second portion of data items to send to the data receiver. The data provider then generates second context information to be included in the second response.

This second provided context information may have the same or different scope than the previous first provided context information, depending on the then-existing circumstances. For example, the first provided context information may include all of the context information. If the data receiver rapidly sends a second request, then the next response may include less or no context information since it appears that the data receiver is actively engaged making it seem like the requests will come in rapid succession, which means that the data provider would not have to maintain context information for long.

Accordingly, the principles of the present invention permit the data provider to have wide flexibility over dynamically adjusting its role in context management depending on the then-existing circumstances. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
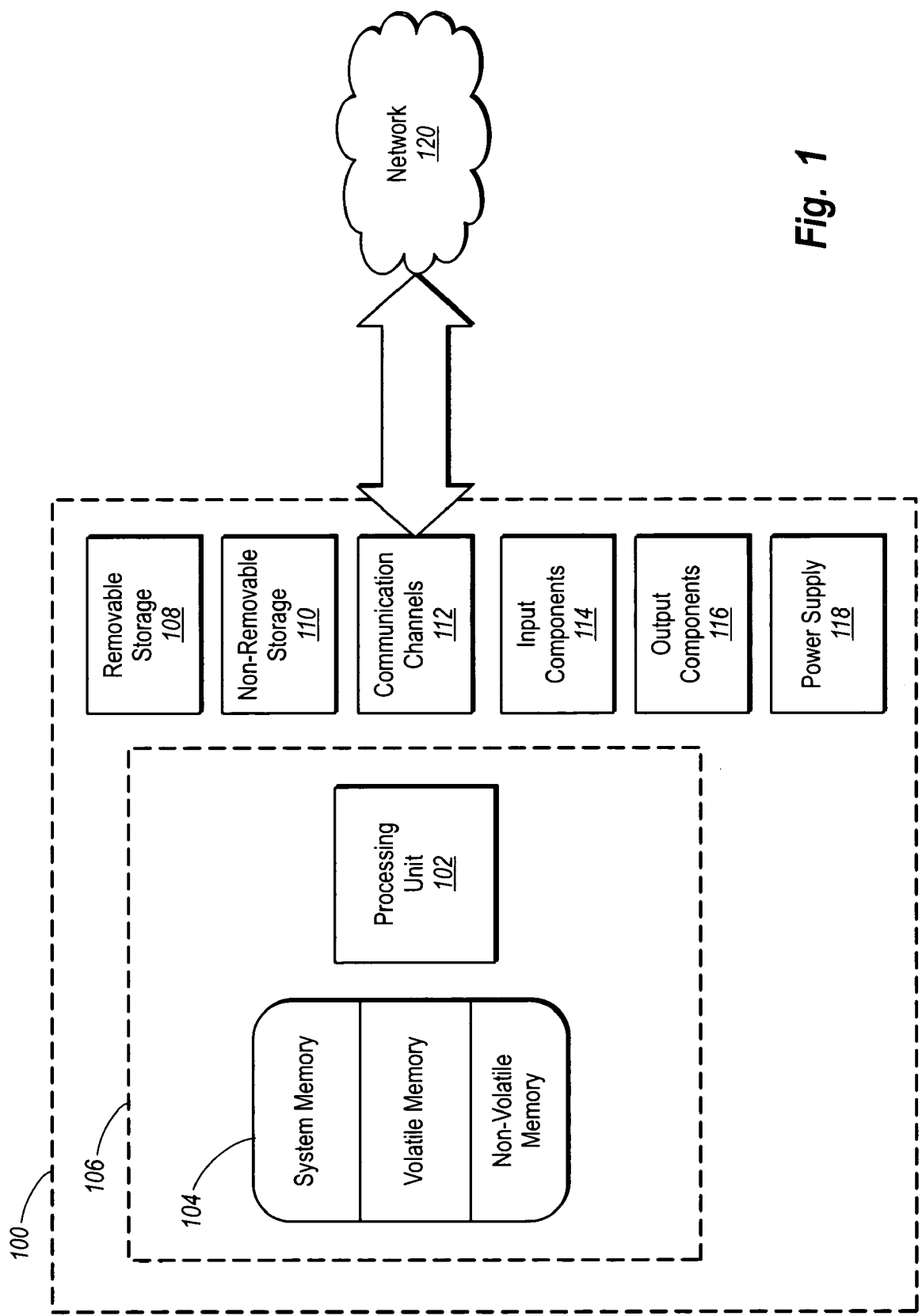
FIG. 1 illustrates a suitable computing system that may implement features of the present invention.

The principles of the present invention relate to a mechanism for a data provider computing system to provide requested data items in a request-driven enumeration session in which portions of the requested data items are provided in response to separate requests from a data receiver computing system. The mechanism permits the data provider to control how much inter-message context information is retained by the data provider, and how much context information is provided to the data receiver.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also FIG. 1 shows a schematic diagram of an example computer architecture usable for these devices. be implemented in hardware.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
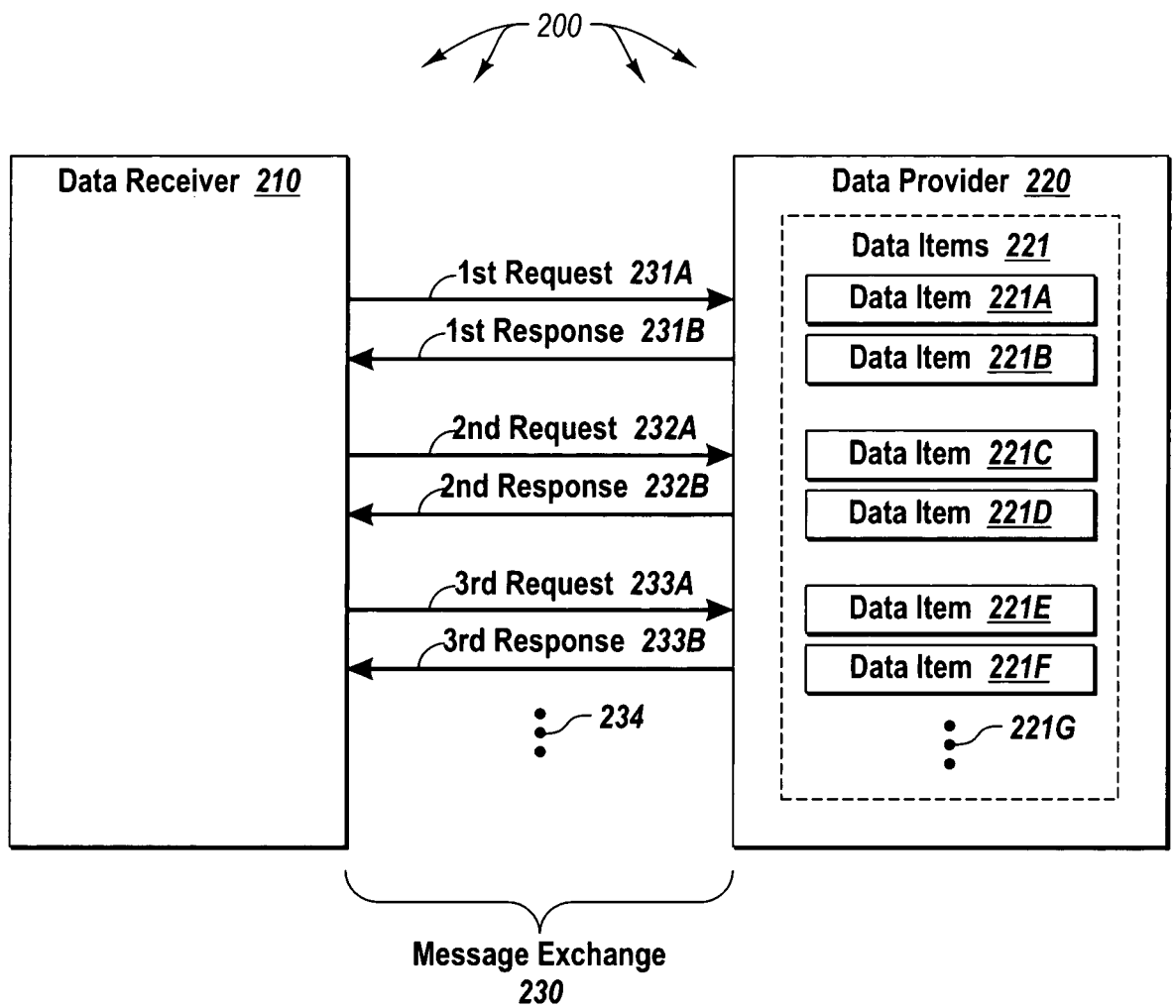
FIG. 2 illustrates a network environment in which a data provider computing system provides a number of data items to a data receiver computing system using a request-driven enumeration message exchange in accordance with the principles of the present invention.

FIG. 2 illustrates a network environment 200 that includes a data provider computing system 220 that is capable of being network connected to a data receiver computing system 210. In this description and in the claims, a "computing system" is defined as any device or system that has a system memory, and at least one processor capable of executing instructions from system memory. Alternatively and in addition, the computing system may have any logic processing capability, even if implemented entirely in hardware. Accordingly, the data receiver computing system 210 and the data provider computing system 220 may, but need not, be structured as described above for the computing system 100.

Also, the use of the terms "data provider" and "data receiver" with respect to computing systems 210 and 220 does not imply that receiving data is the only function supported by the computing system 210, nor that providing data is the only function supported by the computing system 220. Indeed, the computing systems may be highly complex general-purpose computing systems, although this is not required. The data receiver computing system 210 may also be referred to herein as a "data receiver". Similarly, the data provider computing system 220 may also be referred to herein as a "data provider".

The data provider 220 manages a number of data items 221 that are to be provided to the data receiver 210. The data provider 220 may also manage other data items that are not to be provided to the data receiver 210. In the illustrated case, the data provider 220 is to provide data items 221A through 221F to the data receiver computing system as well as potentially other data items as represented by the vertical ellipses 221G.

The data provider 220 provides the data items 221 to the data receiver 210 using a message exchange 230 in accordance with a request-driven enumeration technology session. Specifically, the data items 221 are not provided to the data provider in a single response to a single request. Instead, the data items 221 are provided to the data receiver 210 one portion at a time, which each portion being delivered in response to a request. In one embodiment, the request-driven enumeration technology session may be initiated by the data receiver 210 transmitting a preliminary enumerate request to the data provider 220. The data provider 220 may confirm the session by transmitting an enumerate response back to the data receiver 210. In one specific example described in further detail below, the enumerate request and response may be in the form of Simple Object Access Protocol (SOAP) envelopes containing an eXtensible Markup Language (XML) document. However, the enumerate request and response may also be Remote Method Invocation (RMI) messages.

As illustrated in FIG. 2, the data receiver 210 transmits a first request 231A. In response, the data provider 220 provides data items 221A and 221B in a first response 231B to the first request 231A. This process may be repeated until the data receiver 210 receives all of the data items 221. Specifically, the data receiver 210 transmits a second request 232A. In response, the data provider 220 provides data items 221C and 221D in a second response 232B to the second request 232A. The data receiver 210 then transmits a third request 233A. In response, the data provider 220 provides data items 221E and 221F in a third response 233B to the third request 233A. This process may continue as represented by the vertical ellipses 234 for any further data items represented by the vertical ellipses 221G.

In the illustrated case, at least six data items are illustrated as being provided to the data receiver 210, two data items at a time for each request. However, the principles of the present invention are not limited to this embodiment. Any single request-driven enumeration technology session may be used to transfer any number of data items. Furthermore, the data provider 220 may transmit any number of data items (or even a portion of a data item) in any given response to any given request. Also, since the enumeration of data items to the data receiver 210 is request-driven. The data receiver 210 may stop the data transfer by merely ceasing to transmit any further request.

Figure 3:
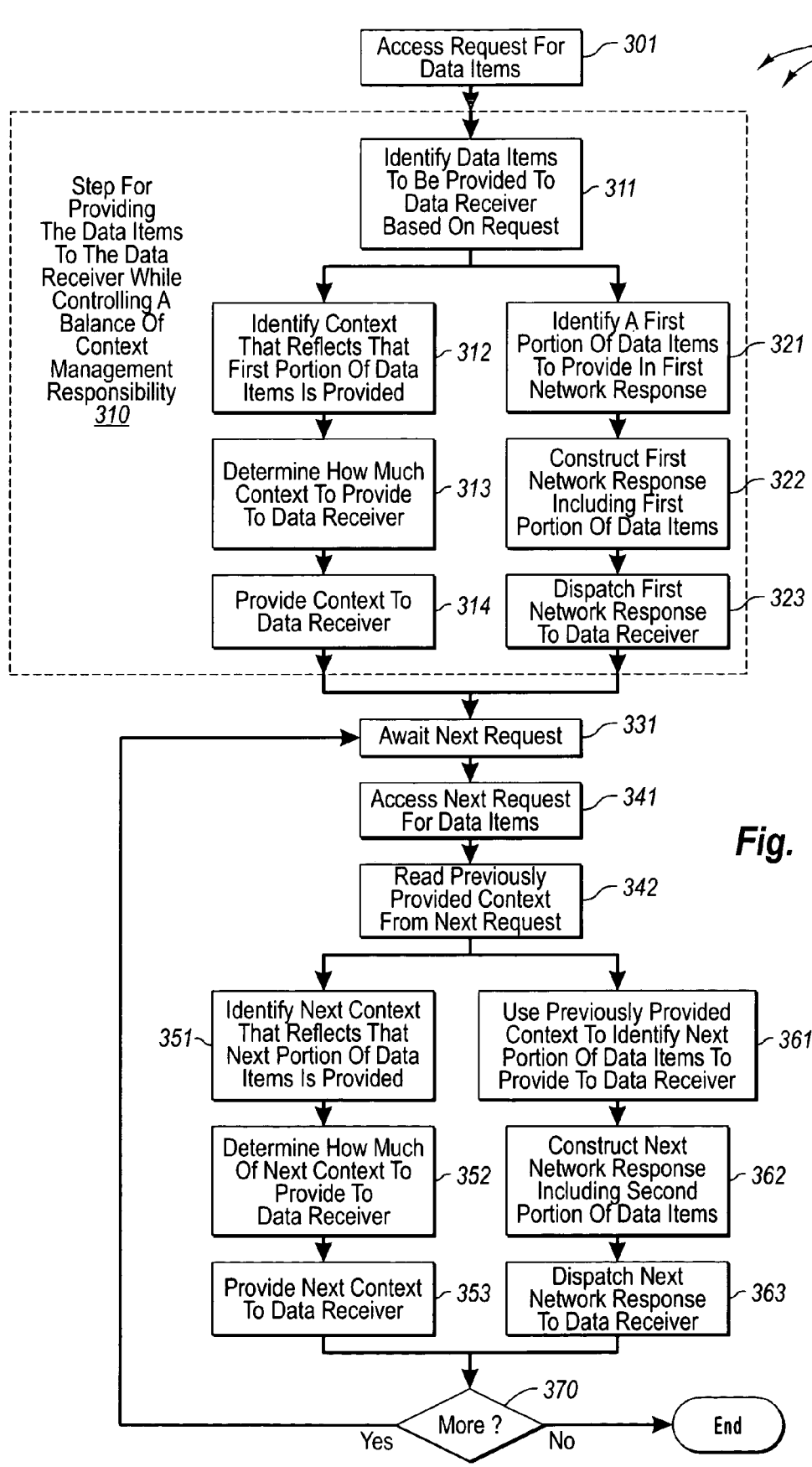
FIG. 3 illustrates a flowchart of a method for the data provider computing system to provide a number of data items to the data receiver computing system while allowing the data provider to control a balance of context management in accordance with the principles of the present invention.
Figure 4:
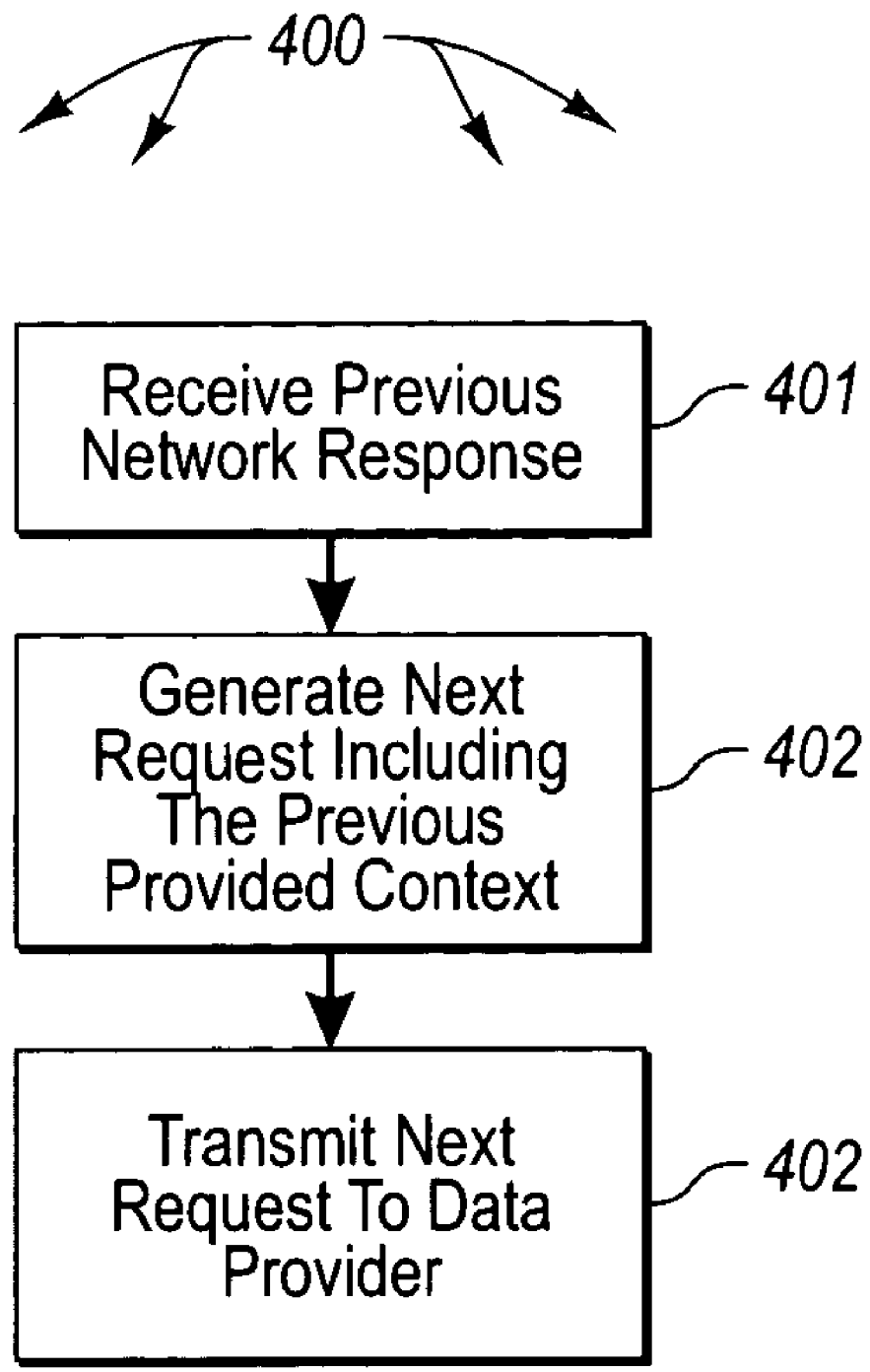
FIG. 4 illustrates a flowchart of a method for the data receiver to collaborate with the data receiver computing system to support the data provider computing system having control of the balance of context management responsibility between the two computing systems.

FIG. 3 illustrates a flowchart of the method 300 for the data provider to provide data items to the data receiver while allowing the data provider to retain control over a balance of context management between the two computing systems. Likewise, FIG. 4 illustrates a flowchart of a method 400 for the data receiver to support the data provider in this role. As the methods 300 and 400 may be performed in the network environment 200, FIGS. 3 and 4 will now be described with frequent reference to FIG. 2.

Referring to FIG. 3, the data provider 220 accesses a request for data items to be provided to a data receiver computing system (act 301). This request may be an internal request within the data provider 220 placed, for example, through a function call. Alternatively, the request may be accessed by receiving the request from other computing systems. In the illustrated embodiment of FIG. 2, the data provider 220 accesses the request by receiving the first request 231A from the data receiver 210. In one embodiment, this request as well as subsequent requests from the data receiver are each a "Pull Request" issued by the data receiver 210. In the described embodiment, the Pull Request may be included in a SOAP envelope, and may be in the form of an XML document. An example, of a Pull Request is provided further below in much greater detail. The Pull Request may also be a Remote Method Invocation (RMI).

The data provider 220 then performs a functional, result-oriented step for providing the data items to the data receiver 210 while controlling a balance in context management between the data provider and the data receiver (step 310). In the illustrated embodiment, this includes at least acts 311 through 314 and 321 through 323, although any acts for accomplishing this result will suffice.

Specifically, the data provider 220 identifies a collection of data items to be provided to the data receiver computing system based at least in part upon information in the request (act 311). The data items may be directly specified in the request. In addition, the data items may be indirectly specified by specifying a collection of data items (also referred to herein as an initial collection or plurality of data items). The request may include a filter to be applied to the initial collection of data items to generate a final collection of data items. In one embodiment, the collection of items to be identified is performed by reading a session identifier in the request. The session identifier may correlate to a prior enumerate request in which the data items were expressly identified. This prior enumerate request may also have included a filter for identifying the data items.

The data provider 220 then identifies a first context that reflects the first portion of the collection of data items is provided to the data receiver computing system (act 312). If the collection of data items was, for example, XML elements, the context may include an identifying for the last XML element that was previously provided, or the next XML element to be provided, or any other information that would be useful to indicate what portion of the collection of data items has already been provided to the data receiver 210, and what portion of the data items is yet to be provided.

The data provider 220 then determines how much of the first context is to be provided to the data receiver 210 (act 313). This may include none, some, or the entire entire first context identified in act 312. Note that even though context information may be provided to the data receiver 210, the data provider may redundantly retain some or the entire provided context for later validation of the context. The decision of how much of the context to provide to the data receiver 210 may be made in accordance with any decision criteria. Relevant decision criteria may include, for example, the current workload and available processing capacity of the data provider 220 or its available memory, the current workload and available processing capacity of the data receiver 210 or its available memory, the available network bandwidth between the data receiver 210 and the data provider 220, the importance of the network receiver or its associated user, or the like. The data provider 220 then provides the first context to the data receiver 210 as appropriate (act 314).

In addition, the data provider 220 identifies a first portion (which is less than all) of the collection of data items to be provided in a first network response to the data receiver (act 321). The terms "first" does not necessarily imply that there were no previous requests or responses between the two computing systems. In fact, in one embodiment described below, there is an entire request/response exchange in the form of an enumerate request and enumerate response in order to get to the point in the session in which pull operations may be used to extract data items one portion at a time.

The data provider then constructs the first network response that includes this first portion (act 322). An example of such a response is described below in the form of a Pull Response, which takes the form of a SOAP envelope having a particular XML structure. The first network response is then dispatched to the data receiver 210 (act 323). In one embodiment, the data provider 220 includes the first context provided to the data receiver 210 within the first network response itself In FIG. 2, this first network response is illustrated as network response 231B.

Since the enumeration session is request-driven, the data provider 220 awaits the next request (act 331) before proceeding further with the session. Referring to FIG. 4, the data receiver 210 is at this stage to take further action before the session continues. The method 400 of FIG. 4 describes the action taken by the data receiver 210 when receiving any network response within the enumeration session, whether the first network response or otherwise. Specifically, the data receiver 210 receives the network response (act 401), generates the next request including the context provided in the network response (act 402), and then transmits the next request to the data provider 220 (act 403). While this context may be directly transplanted from the previous network response to the next network request, this need not be the case. Perhaps only a portion of the context provided in the previously network response is provided in the next request. Furthermore, the context information provided in the next request may have different encoding as compared to how it was encoded in the prior network response. Furthermore, the context provided in the next request may have been further processed (e.g., encrypted and/or compressed) by the data receiver.

Upon receiving the second or any subsequent request for any portion of the remainder of the collection of data items (act 341), the data provider 220 reads the previously provided context from the second request (ac 342), identifies a second context that reflects that the second portion of the plurality of data items is provided to the data receiver computing system (act 351), and determines how much of the next context is to be provided to the data receiver computing system (act 352).

The portion of the context provided to the data receiver 210 may be the same scope as the context previously provided to the data receiver 210, although this need not be the case. The data provider 220 may provide a much different context than previously provided if the circumstances warrant. For example, suppose that the data provider 220 discovers that the data receiver 210 is actively engaging in the request-driven enumeration session, quickly issuing requests whenever it receives a prior response. In that case, there may be less cost for the data provider 220 to maintain the entire context, without providing any to the data receiver 210, since the session is likely to be concluded quickly and not tie up memory resources for a significant period of time. The data provider 220 then provides that portion of the next context that the data provider 220 deems to send to the data receiver 210 (act 353)

The data provider 220 also uses the previous context read from the request to identify the next portion of the collection of data items to be provided to the data receiver (act 361). The data provider 220 then constructs the next network response including the next portion of the collection of data items (act 362). This next network response is then dispatched to the data receiver 210 (act 363). At this stage, if there are no more data items of the collection of data items to provide (No in decision block 370), then the session may end for now. However, if there are more data items (Yes in decision block 370), then the session continues by awaiting the next request in act 331.

Having described the general principles of the present invention, a specific embodiment of the present invention will now be described in detail. In this specific embodiment, each of the requests and responses in the session are structured as SOAP envelopes containing an XML document.

The following illustrates the form of an enumerate request mentioned briefly above. As previously mentioned, the data receiver 210 transmits the enumerate request to the data provider 220 in order to initiate a request-driven enumeration session. Line numbering is added for clarity.

```
1)  <s:Envelope ...>
2)    <s:Header ...>
3)      <wsa:Action>
4)        http://schemas.xmlsoap.org/ws/2004/04/enumeration/Enumerate
5)      </wsa:Action>
6)      <wsa:MessageID>xs:anyURI</wsa:MessageID>
7)      <wsa:To>xs:anyURI</wsa:To>
8)      ...
9)    </s:Header>
10)   <s:Body ...>
11)     <wsen:Enumerate ...>
12)       <wsen:Filter Dialect="xs:anyURI"?> xs:any </wsen:Filter> ?
13)       ...
14)     </wsen:Enumerate>
15)   </s:Body>
16) </s:Envelope>
```

Lines 1 through 16 represent an XML element that defines the entire SOAP envelope. Lines 2 through 9 represent the header element for the SOAP envelope. Lines 3 through 5 represent an action XML element that defines that the action is an enumerate request (see "Enumerate" in line 4). Line 6 identifies a session identifier. Line 7 represents an address of the data provider. Line 8 represents that there may be additional XML elements in the header XML element. Lines 10 through 15 represent the SOAP body XML element. Lines 11 through 14 represent an enumerate XML element that defines information needed for the enumeration session. For example, Line 12 identifies a filter element. The filter element includes a filter dialect attribute, which defines a query language for expressing the filter (e.g., SQL, XPATH, or other URI). In addition, the filter element includes an "any" attribute, which expresses the filter using the specified query language. In this description and in the claims, a "query language" is any set of semantic rules that may be used to express a filter on an initial plurality of data items to generate filtered data items that comprise none, some or all of the initial plurality of data items.

The following is an example of an enumerate request that follows the form described above with line numbering added for clarity.

```
(01) <s:Envelope xmlns:S='http://www.w3.org/2003/05/soap-envelope'
(02)   xmlns:wsa='http://schemas.xmlsoap.org/ws/2004/03/addressing'
(03)   xmlns:wxf="http://schemas.xmlsoap.org/ws/2004/04/enumeration'>
(04)   <s:Header>
(05)     <wsa:Action>
(06)       http://schemas.xmlsoap.org/ws/2004/04/enumeration/Enumerate
(07)     </wsa:Action>
(08)     <wsa:MessageID>
(09)       uuid:e7c5726b-de29-4313-b4d4-b3425b200839
(10)     </wsa:MessageID>
(11)     <wsa:To>http://www.example.com/relayAgent/enum19</wsa:To>
(12)   </s:Header>
(13)   <s:Body>
(14)     <wsen:Enumerate/>
(15)   <S/:Body>
(16) </s:Envelope>
```

Lines (05-07) indicate this message is an enumerate request and that the data source is expected to respond with an enumerate response message. No wse:Filter element is present, so the resultant enumeration context is expected to return all available elements.

The data provider 220 may respond to the enumerate request with an enumerate response in order to fully initialize the request-driven enumeration session, and may adhere to the following form with line numbering added for clarity.

```
1)  <s:Envelope ...>
2)    <s:Header ...>
3)      <wsa:Action>
4)        http://schemas.xmlsoap.org/ws/2004/04/enumeration/
          EnumerateResponse
5)      </wsa:Action>
6)      ...
7)    </s:Header>
8)    <s:Body ...>
9)      <wsen:EnumerateResponse ...>
10)       <wsen:EnumerationContext>...</wsen:EnumerationContext>
11)       ...
12)     </wsen:EnumerateResponse>
13)   </s:Body>
14) </s:Envelope>
```

Lines 1 through 14 represent an XML element that defines the entire SOAP envelope. Lines 2 through 7 represent the header element for the SOAP envelope. Lines 3 through 5 represent an action XML element that defines that the action is an enumerate response (see "EnumerateResponse" in line 4). Line 6 represents that there may be additional XML elements in the header XML element that spans from lines 2 through 7. Lines 8 through 13 represent the SOAP body XML element. Lines 9 through 12 represent an enumerate response XML element that defines information used to complete initialization of the enumeration session. For example, Line 10 is an enumeration context XML element that includes an initial context that may include enough information to identify a context for any future Pull Requests in the session. The EnumerationContext element contains the XML representation of the new enumeration context. The data receiver 210 pass this XML data in Pull requests for this enumeration context, until and unless a Pull Response message (described further below) updates the enumeration context. Line 11 represents that there may be further XML elements included in the enumeration context XML element.

The following is a hypothetical enumerate response that follows the above-described form.

```
(01) <s:Envelope xmlns:S='http://www.w3.org/2003/05/soap-envelope'
(02)   xmlns:wxf='http://schemas.xmlsoap.org/ws/2004/04/enumeration'
(03)   xmlns:wsa='http://schemas.xmlsoap.org/ws/2004/03/addressing'
(04)>
(05)   <s:Header>
(06)     <wsa:Action>
(07)       http://schemas.xmlsoap.org/ws/2004/04/enumeration/
           EnumerateResponse
(08)     </wsa:Action>
(09)     <wsa:RelatesTo>
(10)       uuid:e7c5726b-de29-4313-b4d4-b3425b200839
(11)     </wsa:RelatesTo>
(12)   </s:Header>
(13)   <s:Body>
(14)     <wsen:EnumerateResponse>
(15)       <wsen:EnumerationContext>
(16)         123
(17)       </wsen:EnumerationContext>
(18)     </wsen:EnumerateResponse>
(19)   </s:Body>
(20) </s:Envelope>
```

Lines 06-08 indicate this message is an enumerate response message. Lines 15-17 are the XML representation of the enumeration context that supports the Pull operation described below.

The Pull operation may be initiated by the data receiver 210 sending a Pull request message to the data provider 220. The following is an example form for the Pull request with line numbering added for clarity.

```
1)   <s:Envelope ...>
2)      <s:Header ...>
3)         <wsa:Action>
4)            http://schemas.xmlsoap.org/ws/2004/04/enumeration/Pull
5)         </wsa:Action>
6)         <wsa:MessageID>xs:anyURI</wsa:MessageID>
7)         <wsa:ReplyTo>wsa:EndpointReference</wsa:ReplyTo>
8)         <wsa:To>xs:anyURI</wsa:To>
9)         ...
10)     </s:Header>
11)     <s:Body ...>
12)        <wsen:Pull ...>
13)           <wsen:EnumerationContext>...</wsen:EnumerationContext>
14)           <wsen:MaxTime>xsd:duration</wsen:MaxTime> ?
15)           <wsen:MaxElements>xsd:long</wsen:MaxElements> ?
16)           <wsen:MaxCharacters>xsd:long</wsen:MaxCharacters> ?
17)           ...
18)        </wsen:Pull>
19)     </s:Body>
20)  </s:Envelope>
```

Lines 1 through 20 define the entire XML element that is the SOAP structured Pull request. Lines 2 through 10 define the header XML element. Lines 3 through 5 are the action elements in which the action is defined as a pull request (see "Pull" in line 4). Line 6 is the message identifier XML element. This element includes an identifier that correlates the Pull Request with the session. Line 7 is a "reply to" XML element which provides an address for the response to the Pull request. Line 8 is an address XML element that specifies an address of the data provider 220. Line 9 indicates that there may be more XML elements contained by the header XML element.

Lines 11 through 19 represent the body XML element. Specifically, Lines 12 through 18 represents a Pull XML element that contains information used in the Pull Request. For example, line 13 is the enumeration context element in which the previously provided enumeration context is inserted. This enumeration context is used by the data provider 220 to identify what the session context is.

Line 14 is a maximum time XML element, which reflects a maximum amount of time that the data provider 220 should allow after receiving a Pull request before the data provider 220 provides an associated Pull Response. Before sending the associated Pull response, the data provider 220 will ensure that this maximum time is not exceeded.

Line 15 is a maximum element XML element, which reflects a maximum number of XML elements that the provider 220 should allow in the associated Pull response. Before sending the associated Pull response, the data provider 220 will ensure that the Pull response does not contain more than this maximum number of XML elements.

Line 16 is a maximum character XML element, which represents a maximum number of characters that the provider 220 should allow in the associated Pull response. Before sending the associated Pull response, the data provider 220 will ensure that the Pull response does not contain more than this maximum number of characters.

The following is an example Pull request with line numbering for clarity:

```
(01) <s:Envelope xmlns:S='http://www.w3.org/2003/05/soap-envelope'
(02)    xmlns:wsa='http://schemas.xmlsoap.org/ws/2004/03/addressing'
(03)    xmlns:wsen="http://schemas.xmlsoap.org/ws/2004/04/
           enumeration'>
(04)    <s:Header>
(05)       <wsa:Action>
(06)          http://schemas.xmlsoap.org/ws/2004/04/enumeration/Pull
(07)       </wsa:Action>
(08)       <wsa:MessageID>
(09)          uuid:e7c5726b-de29-4313-b4d4-b3425b200839
(10)       </wsa:MessageID>
(11)       <wsa:To>http://www.example.com/relayAgent</wsa:To>
(12)    </s:Header>
(13)    <s:Body>
(14)       <wsen:Pull>
(15)          <wsen:EnumerationContext>123</wsen:EnumerationContext>
(16)          <wsen:MaxTime>P30S</wsen:MaxTime>
(17)          <wsen:MaxElements>10</wsen:MaxElements>
(18)       </wsen:Pull>
(19)    <S/:Body>
(20) </s:Envelope>
```

Lines (05-07) in Table 2 indicate this message is a Pull request and that the data source is expected to respond with a Pull response message. Line (16) indicates that the response message should be generated no more than 30 seconds after receipt of the Pull request message. Line (17) indicates that no more than 10 elements should be returned in the body of the Pull response message.

Upon receipt and processing of a Pull Request, the data receiver 210 may generate a Pull Response. The following is an example form of such a Pull Response with line numbering added for clarity.

```
1)   <s:Envelope ...>
2)      <s:Header ...>
3)         <wsa:Action>
4)            http://schemas.xmlsoap.org/ws/2004/04/enumeration/
              PullResponse
5)         </wsa:Action>
6)         ...
7)      </s:Header>
8)      <s:Body ...>
9)         <wsen:PullResponse ...>
10)           <wsen:EnumerationContext>...</wsen:EnumerationContext> ?
11)           <wsen:Items> ?
12)              <xs:any> enumeration-specific element </xs:any> +
13)           </wsen:Items>
14)           <wsen:EndOfSequence/> ?
15)           ...
16)        </wsen:PullResponse>
17)     </s:Body>
18)  </s:Envelope>
```

Lines 1 through 18 represent the entire SOAP envelope XML element. Lines 2 through 7 represent the header element for the SOAP envelope. Lines 3 through 5 k represent an action XML element that defines that the action is a pull response (see "PullResponse" in line 4). Line 6 represents that there may be additional XML elements in the header XML element that spans from lines 2 through 7.

Lines 8 through 17 represent a body XML element. Lines 9 through 16 represent a pull response XML element that contains elements that are part of the response. Line 10 is an enumeration context XML element that contains the enumeration context for the next request. Lines 11 through 13 represent an items XML element that contains the entire portion of the data items to be provided in that response. Line 12 is the descendent XML element that actually contains the data items. Line 14 is an end of sequence XML element which may be provided when all of the data items have been provided to the data receiver 210. In this manner, the data receiver 210 may be informed of the end of the enumeration session. The body XML element may also have another optional XML element that specifies when the data items provided are not contiguous because one or more data items have been skipped. That XML element may also specify why the data item was skipped. For example, perhaps the data item was current in use and thus access was restricted. Furthermore, perhaps the data items could not all be included in the response because of the maximum time, element, or character restriction imposed by the Pull request.

The following is an example of a Pull Response with line number added for clarity:

```
(01) <s:Envelope xmlns:S='http://www.w3.org/2003/05/soap-envelope'
(02)     xmlns:wsen='http://schemas.xmlsoap.org/ws/2004/04/enumeration'
(03)     xmlns:wsa='http://schemas.xmlsoap.org/ws/2004/03/addressing'
(04) >
(05) <s:Header>
(06)   <wsa:Action>
(07)     http://schemas.xmlsoap.org/ws/2004/04/enumeration/
         PullResponse
(08)   </wsa:Action>
(09)   <wsa:RelatesTo>
(10)     uuid:e7c5726b-de29-4313-b4d4-b3425b200839
(11)   </wsa:RelatesTo>
(12) </s:Header>
(13) <s:Body>
(14)   <wsen:PullResponse>
(15)     <wsen:Items xmlns:xx="http://fabrikam123.com/schema/log">
(16)       <xx:LogEntry id="1">System booted</xx:LogEntry>
(17)       <xx:LogEntry id="2">AppX started</xx:LogEntry>
(18)       <xx:LogEntry id="3">John Smith logged on</xx:LogEntry>
(19)       <xx:LogEntry id="4">AppY started</xx:LogEntry>
(20)       <xx:LogEntry id="5">AppX crashed</xx:LogEntry>
(21)     </wsen:Items>
(22)     <wsen:EndOfSequence/>
(23)   </wsen:PullResponse>
(24) </s:Body>
(25)</s:Envelope>
```

Lines (06-08) in Table 3 indicate this message is a Pull response message. Lines 15-19 are the five elements returned by this Pull request. The presence of a wsen:EndOfSequence element (line (20)) indicates that no more elements are available and that the enumeration context is now invalid.

As one optimization, a release operation may be performed to allow the data receiver 210 to end the session before all data items have been provided. The Release operation is initiated by the data receiver 210 sending a Release request to the data provider 220. An example release message has the following form with line numbering added for clarity.

```
1) <s:Envelope ...>
2)   <s:Header ...>
3)     <wsa:Action>
4)       http://schemas.xmlsoap.org/ws/2004/04/enumeration/Release
5)     </wsa:Action>
6)     <wsa:MessageID>xs:anyURI</wsa:MessageID>
7)     <wsa:ReplyTo>wsa:EndpointReference</wsa:ReplyTo>
8)     <wsa:To>xs:anyURI</wsa:To>
9)     ...
10)  </s:Header>
11)  <s:Body ...>
12)    <wsen:Release ...>
```

-continued

```
13)      <wsen:EnumerationContext>...</wsen:EnumerationContext>
14)      ...
15)    </wsen:Release>
16)  </s:Body>
17)</s:Envelope>
```

Line 4 identifies the message as being a Release request, with lines 12 through 15 identifying the enumeration context for the enumeration session being released.

Upon successful processing of a Release request, the data provider 220 may provide a Release Response that has the following example form with line numbering added for clarity.

```
1) <s:Envelope ...>
2)   <s:Header ...>
3)     <wsa:Action>
4)       http://schemas.xmlsoap.org/ws/2004/04/enumeration/
         ReleaseResponse
5)     </wsa:Action>
6)     ...
7)   </s:Header>
8)   <s:Body />
9) </s:Envelope>
```

Line 4 identifies the message as a Release Response.

Accordingly, the principles of the present invention permit the data provider to have wide flexibility over dynamically adjusting its role in context management depending on the then-existing circumstances.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In an environment that includes a data provider computing system that is capable of being network connected to a data receiver computing system, a method for the data provider computing system to provide a plurality of requested data items in a plurality of separate electronic messages to the data receiver computing system while controlling how much inter-message state information is retained by the data provider computing system, the method comprising:

the data provider managing a plurality of data items to be provided to the data receiver, the data items to be provided one portion at a time, each portion being delivered in response to a specific request;

an act of accessing a request for data items to be provided to the data receiver computing system;

an act of identifying a first portion of the plurality of data items to be provided in a first network response to the data receiver computing system, the first portion being less than all of the plurality of data items;

an act of identifying a context, the context identifying the portion of the plurality of data items to be provided to the data receiver computing system by the first portion within the first network response;

an act of determining a portion of the context to be provided to the data receiver computing system within a response, the response including the first portion of the plurality of data items, the portion of the context to be included in a subsequent request from the data receiver to the data provider for a subsequent portion of the plurality of data items, the portion of the context to be read from the subsequent request by the data provider, the portion of the context to be used by the data provider to identify a next portion of the plurality of data items to be provided to the data receiver in response to the subsequent request;

an act of constructing the first network response, the first network response including both the first portion of plurality of data items and the portion of the context; and an act of dispatching the first network response to the data receiver computing system wherein the act of identifying a first portion of the plurality of data items to be provided in a first network response to the data receiver computing system comprises the following:

an act of reading from the request a maximum number of data items to be provided in the first network response; and an act of determining that the first portion of the plurality of data items is equal to the maximum number of data items.

2. A method in accordance with claim 1, wherein the provided context is in the first network response.

3. A method in accordance with claim 1, wherein the provided context indicates that the last of the plurality of data items have been provided.

4. A method in accordance with claim 1, wherein the act of accessing a request for data items to be provided to the data receiver computing system comprises an act of accessing an internal request for the data items to be provided to the data receiver computing system.

5. A method in accordance with claim 1, wherein the act of accessing a request for data items to be provided to the data receiver computing system comprises an act of receiving a network request from the data receiver computing system for the data items to be provided to the data receiver computing system.

6. A method in accordance with claim 1, wherein the plurality of data items is a final plurality of data items, wherein the act of identifying a plurality of data items to be provided to the data receiver computing system based at least in part upon information in the request comprises the following:

an act of identifying an initial plurality of data items based at least in part upon information in the request; and an act of selecting the final plurality of data items based on further criteria specified in the request.

7. A method in accordance with claim 6, wherein the act of selecting the final plurality of data items based on further criteria specified in the request comprises the following:

an act of identifying a query language based at least in part upon information in the request;

an act of interpreting a query in the request using the identified query language; and an act of filtering the final plurality of data items by applying the interpreted query.

8. A method in accordance with claim 1, wherein the act of identifying a first portion of the plurality of data items to be provided in a first network response to the data receiver computing system comprises the following:

an act of reading from the request a maximum number of characters to be provided in the first network response; and an act of determining that the first portion of the plurality of data items is equal to or less than the maximum number of characters.

9. A method in accordance with claim 1, wherein the act of identifying a first portion of the plurality of data items to be provided in a first network response to the data receiver computing system comprises the following:

an act of reading from the request a maximum response time for the first network response to take; and an act of determining that the first network response may be return within the maximum response time given the first portion of the plurality of data items.

10. A method in accordance with claim 1, wherein the act of determining how much of the context is to be provided to the data receiver computing system comprises an act of determining that none of the context is to be provided to the data receiver computing system.

11. A method in accordance with claim 1, wherein the act of determining how much of the context is to be provided to the data receiver computing system comprises an act of determining that some of the context is to be provided to the data receiver computing system.

12. A method in accordance with claim 11, further comprising:

an act of redundantly retaining some of the context provided to the data receiver computing system.

13. A method in accordance with claim 1, wherein the act of determining how much of the context is to be provided to the data receiver computing system comprises an act of determining that all of the context is to be provided to the data receiver computing system.

14. A method in accordance with claim 13, further comprising:

an act of redundantly retaining some of the context provided to the data receiver computing system.

15. A method in accordance with claim 1, wherein the request is a Simply Object Access Protocol (SOAP) envelope.

16. A method in accordance with claim 1, wherein the request is a Remote Method Invocation (RMI).

17. A method in accordance with claim 1, wherein the data items are eXtensible Markup Language (XML) elements.

18. A method in accordance with claim 1, wherein the provided context is first context, the method further comprising:

an act of accessing a second request in the form of a network request for the data items from the data receiver computing system;

an act of reading the first provided context from the second request; and an act of using first provided context read from the second request to identify a second portion of the plurality of data items to be provided to the data receiver computing system.

19. A method in accordance with claim 18, further comprising:

an act of constructing a second network response including the second portion of plurality of data items;

an act of dispatching the second network response to the data receiver computing system;

an act of identifying a second context that reflects that the second portion of the plurality of data items is provided to the data receiver computing system;

an act of determining how much of the second context is to be provided to the data receiver computing system; and an act of providing second context to the data receiver computing system as determined in accordance with the act of determining how much of the second context is to be provided to the data receiver computing system.

20. A method in accordance with claim 19, wherein the second context has the same scope as the first context.

21. A method in accordance with claim 19, wherein the second context has a different scope as the first context.

22. A method in accordance with claim 21, wherein the act of determining how much of the second context is to be provided to the data receiver computing system comprises:
an act of evaluating behavior of the data receiver computing system.

23. A method in accordance with claim 21, wherein the of determining how much of the second context is to be provided to the data receiver computing system comprises:
an act of evaluating current conditions of the data provider computing system.

24. A computer program product for use in an environment that includes a data provider computing system that is capable of being network connected to a data receiver computing system, the computer program product for implementing a method for the data provider computing system to provide a plurality of requested data items in a plurality of separate electronic messages to the data receiver computing system while controlling how much inter-message state information is retained by the data provider computing system, the computer program product comprising one or more computer-readable storage media encoded with computer-executable instructions that, when executed by one or more processors of the data provider computing system, cause the data provider computing system to perform the method of claim 1.

25. A computer program product in accordance with claim 24, wherein the provided context indicates that the last of the plurality of data items have been provided.

26. A computer program product in accordance with claim 24, wherein the provided context is in the first network response.

27. A computer program product in accordance with claim 24, wherein the act of accessing a request for data items to be provided to the data receiver computing system comprises an act of accessing an internal request for the data items to be provided to the data receiver computing system.

28. A computer program product in accordance with claim 24, wherein the act of accessing a request for data items to be provided to the data receiver computing system comprises an act of receiving a network request from the data receiver computing system for the data items to be provided to the data receiver computing system.

29. A computer program product in accordance with claim 24, wherein the plurality of data items is a final plurality of data items, wherein the act of identifying a plurality of data items to be provided to the data receiver computing system based at least in part upon information in the request comprises the following:
an act of identifying an initial plurality of data items based at least in part upon information in the request; and
an act of selecting the final plurality of data items based on further criteria specified in the request.

30. A computer program product in accordance with claim 29, wherein the act of selecting the final plurality of data items based on further criteria specified in the request comprises the following:
an act of identifying a query language based at least in part upon information in the request;
an act of interpreting a query in the request using the identified query language; and
an act of filtering the final plurality of data items by applying the interpreted query.

31. A computer program product in accordance with claim 24, wherein the act of identifying a first portion of the plurality of data items to be provided in a first network response to the data receiver computing system comprises the following:
an act of reading from the request a maximum number of characters to be provided in the first network response; and
an act of determining that the first portion of the plurality of data items is equal to or less than the maximum number of characters.

32. A computer program product in accordance with claim 24, wherein the act of identifying a first portion of the plurality of data items to be provided in a first network response to the data receiver computing system comprises the following:
an act of reading from the request a maximum response time for the first network response to take; and
an act of determining that the first network response may be return within the maximum response time given the first portion of the plurality of data items.

33. A computer program product in accordance with claim 24, wherein the act of determining how much of the context is to be provided to the data receiver computing system comprises an act of determining that none of the context is to be provided to the data receiver computing system.

34. A computer program product in accordance with claim 24, wherein the act of determining how much of the context is to be provided to the data receiver computing system comprises an act of determining that some of the context is to be provided to the data receiver computing system.

35. A computer program product in accordance with claim 34, the method further comprising:
an act of redundantly retaining some of the context provided to the data receiver computing system.

36. A computer program product in accordance with claim 24, wherein the act of determining how much of the context is to be provided to the data receiver computing system comprises an act of determining that all of the context is to be provided to the data receiver computing system.

37. A computer program product in accordance with claim 36, the method further comprising:
an act of redundantly retaining some of the context provided to the data receiver computing system.

38. A computer program product in accordance with claim 24, wherein the request is a Simply Object Access Protocol (SOAP) envelope.

39. A computer program product in accordance with claim 24, wherein the request is a Remote Method Invocation (RMI).

40. A computer program product in accordance with claim 24, wherein the data items are eXtensible Markup Language (XML) elements.

41. A computer program product in accordance with claim 24, wherein the provided context is first context, the method further comprising:
an act of accessing a second request in the form of a network request for the data items from the data receiver computing system;
an act of reading the first provided context from the second request; and
an act of using first provided context read from the second request to identify a second portion of the plurality of data items to be provided to the data receiver computing system.

42. A computer program product in accordance with claim 41, wherein the context is a first context, and wherein the method further comprises:

an act of constructing a second network response including the second portion of plurality of data items;

an act of dispatching the second network response to the data receiver computing system;

an act of identifying a second context that reflects that the second portion of the plurality of data items is provided to the data receiver computing system;

an act of determining how much of the second context is to be provided to the data receiver computing system; and an act of providing second context to the data receiver computing system as determined in accordance with the act of determining how much of the second context is to be provided to the data receiver computing system.

43. A computer program product in accordance with claim 42, wherein the second context has the same scope as the first context.

44. A computer program product in accordance with claim 42, wherein the second context has a different scope as the first context.

45. A computer program product in accordance with claim 44, wherein the act of determining how much of the second context is to be provided to the data receiver computing system comprises:

an act of evaluating behavior of the data receiver computing system.

46. A computer program product in accordance with claim 44, wherein the of determining how much of the second context is to be provided to the data receiver computing system comprises:

an act of evaluating current conditions of the data provider computing system.

* * * * *